United States Patent
Otomo et al.

(10) Patent No.: US 6,698,639 B1
(45) Date of Patent: Mar. 2, 2004

(54) AUTOMATIC WIRE SUPPLY SYSTEM OF WIRE CUT ELECTRODISCHARGE MACHINE

(75) Inventors: Yoichi Otomo, Tokyo (JP); Hisashi Yamada, Tokyo (JP); Yutaka Terada, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/111,083

(22) PCT Filed: Oct. 20, 1999

(86) PCT No.: PCT/JP99/05796

§ 371 (c)(1), (2), (4) Date: Apr. 19, 2002

(87) PCT Pub. No.: WO01/28725

PCT Pub. Date: Apr. 26, 2001

(51) Int. Cl.⁷ .............................. B65H 20/00; B23H 7/04
(52) U.S. Cl. .................................. 226/97.4; 219/69.12
(58) Field of Search ..................... 226/97.4; 219/69.12, 219/69.16

(56) References Cited

FOREIGN PATENT DOCUMENTS

| JP | 62-188627 | 8/1987 |
| JP | 2-48122 | 2/1990 |
| JP | 2-224926 | 9/1990 |
| JP | 4-300122 | 10/1992 |

*Primary Examiner*—Michael R. Mansen
(74) *Attorney, Agent, or Firm*—Sughrue Mion, PLLC

(57) ABSTRACT

An automatic wire feeder of a wire electric discharge machine in which electric discharge is generated between a traveling wire electrode (1) and a workpiece so as to machine the workpiece by the electric discharge energy, comprises: a feed roller (2) for feeding the wire electrode (1); a slider block (11) supported being capable of going up and down; a guide pipe (9), fixed to the slider block (11), for guiding the wire electrode (1); a hollow member (10), fixed to the slider block (11), the outer diameter of which is reduced in a wire feed direction; and a pressurized gas supply for supplying pressurized gas toward the outer diameter of the hollow member (10), wherein a forward end section of the hollow member (10) is inserted into an inner diameter section of an upper section of the guide pipe (9) while a predetermined overlapping length L is kept, a predetermined clearance D1 is formed between the inner diameter of the guide pipe (9) and the outer diameter of the forward end section of the hollow member (10), and a thrust is given to the wire electrode (1) by pressurized gas, which is supplied by the pressurized gas supply. By the conveyance force of pressurized gas flowing in the guide pipe (9), the wire electrode (1) can be automatically fed with high reliability.

13 Claims, 8 Drawing Sheets

AUTOMATIC WIRE SUPPLY SYSTEM OF WIRE CUT ELECTRODISCHARGE MACHINE

TECHNICAL FIELD

The present invention relates to improvements in an automatic wire feeder of a wire electric discharge machine in which an electric discharge is generated between a traveling wire electrode and a workpiece so that the workpiece is machined by electric discharge energy.

BACKGROUND ART

FIG. 7 is an arrangement view showing an automatic wire feeder of a conventional wire electric discharge machine disclosed in Japanese Unexamined Patent Publication No. 2-224926. In the view, reference numeral 1 is a wire electrode, reference numeral 2 is a feed roller for giving a feed force to the wire electrode 1 in the case of automatic feed operation of the wire electrode 1, reference numeral 2a is a motor for driving the feed roller 2, reference numeral 3 is a pinch roller for pressing the wire electrode 1 to the feeder roller 2, reference numeral 4 is a first guide pipe, reference numeral 5 is a second guide pipe, capable of going up and down, for guiding the wire electrode 1 to the upper wire guide 6 when the second guide pipe goes down in the case of automatic feed operation of the wire electrode 1, reference numeral 7 is a cylinder block for elevating the second guide pipe 5 by air pressure, reference numerals 7a and 7b are inflow ports of air of the cylinder block 7, reference numeral 7c is air of high pressure, and reference numeral 8 is a jet nozzle for generating a water column to guide the wire electrode 1 which passes between the upper wire guide 6 and a lower wire guide not shown in the case of automatic feed operation of the wire electrode 1.

Next, operation will be explained below. A positional relation between the wire electrode 1 and each component of the automatic wire feeder before the start of automatic feed of the wire electrode 1 is shown in FIG. 7. Air 7c of high pressure (0.4 to 0.5 MPa) is made to flow into the cylinder block 7 from the inflow port 7a of air. An upper section of the second guide pipe 5 is formed into a piston. Therefore, the second guide pipe 5 is lowered to a position shown in FIG. 7 by the pressure of air 7c of high pressure. After the completion of this motion, the feed roller 2 is rotated by driving the motor 2a, so that the wire feeding can be started. As shown in FIG. 8, air 7c of high pressure for lowering the second guide pipe 5 flows from clearance (D in the drawing), which is formed between the first guide pipe 4 and the second guide pipe 5, into the second guide pipe 5, and the wire electrode 1 is vibrated by the air of high pressure flowing in this second guide pipe 5. While the wire electrode 1 is being vibrated as described above, the wire electrode 1 is guided by the second guide pipe 5 to the upper wire guide 6 shown in FIG. 7. In FIG. 7, after passing through the upper wire guide 6, the wire electrode 1 is guided by a water column formed by water jetted out from the jet nozzle 8 and passes through a machining start hole formed in a workpiece not shown in the drawing, so that the wire electrode 1 is guided to a lower guide not shown in the drawing. After passing through the lower wire guide, the wire electrode 1 arrives at a recovery roller not shown in the drawing. In this way, the automatic feed motion of feeding the wire electrode is completed.

Since the automatic wire feeder of the conventional wire electric discharge machine is composed as described above, a thrust is given to the wire electrode 1 by the torque generated by the feed roller in the process of the automatic feed motion of the wire electrode. That is, a current of air flowing from clearance (D shown in FIG. 8), which is formed between the first guide pipe 4 and the second guide pipe 5, into the second guide pipe 5 does not effectively contribute to an increase in the thrust to be given to the wire electrode.

In this structure, the following means is adopted. In order to reduce a frictional force generated between the wire electrode 1 and the first guide pipe 4 and also to reduce a frictional force generated between the wire electrode 1 and the second guide pipe 5 in the traveling passage of the wire electrode 1 so as to prevent the occurrence of buckling of the wire electrode, the wire electrode 1 is vibrated by higher pressure air 7c. For example, in the case where the diameter of the wire electrode is not more than 0.1 mm or in the case where a large curl is formed in the wire electrode, buckling of the wire electrode is caused in the guide pipe 5 or the upper wire guide section in some cases. Accordingly, in the conventional automatic wire feeder, it is impossible to ensure high reliability of automatic feed of the wire electrode.

Further, the guide pipe of the automatic wire feeder of the conventional wire electric discharge machine is composed of a double pipe structure including the first and the second guide pipe. Therefore, the mechanism is complicated, and further the guide pipe tends to be clogged by wire chips and wire pieces. Further, in the case where the guide pipe is clogged by wire chips, it is difficult to remove them. Accordingly, the conventional automatic wire feeder is disadvantageous in that the reliability of automatic feed of the wire electrode is lowered and further the maintenance cost is increased.

DISCLOSURE OF INVENTION

The present invention has been accomplished to solve the above problems. It is an object of the present invention to provide an automatic wire feeder of a wire electric discharge machine, the reliability of which is high, capable of suppressing an increase in the maintenance cost.

The present invention provides an automatic wire feeder of a wire electric discharge machine in which electric discharge is generated between a traveling wire electrode and a workpiece so as to machine the workpiece by the electric discharge energy, comprising: a feed roller for feeding the wire electrode; a slider block supported being capable of going up and down; a guide pipe, fixed to the slider block, for guiding the wire electrode; a hollow member, fixed to the slider block, the outer diameter of which is reduced in the wire feed direction; and a pressurized gas supply means for supplying pressurized gas toward the outer diameter of the hollow member, wherein a forward end section of the hollow member is inserted into an inner diameter section of an upper section of the guide pipe while a predetermined overlapping length is kept, a predetermined clearance is formed between the inner diameter of the guide pipe and the outer diameter of the forward end section of the hollow member, and a thrust is given to the wire electrode when pressurized gas, which is supplied by the pressurized gas supply means, flows in the guide pipe via the clearance.

In an automatic wire feeder of a wire electric discharge machine, the inner diameter of the upper section of the guide pipe is reduced in the wire feed direction.

In an automatic wire feeder of a wire electric discharge machine, the inner diameter portion of the hollow member is formed into a nozzle profile.

An automatic wire feeder of a wire electric discharge machine further comprises: a pressurized gas stopping means for stopping a current of pressurized gas flowing in the guide pipe at a forward end of the guide pipe, the pressurized gas stopping means capable of retracting from the wire traveling passage, wherein when it is necessary to wash the inside of the guide pipe, the passage of pressurized gas in the guide pipe is closed by the pressurized gas stopping means and pressurized gas is supplied from the pressurized gas supply means so as to wash the inside of the guide pipe.

In an automatic wire feeder of a wire electric discharge machine, a slit is formed at a forward end of the guide pipe.

In an automatic wire feeder of a wire electric discharge machine, the slit is formed in a direction substantially perpendicular to a plane on which a curl of the wire electrode is formed.

Since the present invention is composed as described above, the following effects can be provided.

In an automatic wire feeder of a wire electric discharge machine of the present invention, it is possible to automatically feed a wire electrode with high reliability by a conveyance force of pressurized gas flowing in a guide pipe.

Further, it is possible to conduct self-washing inside the guide pipe. Therefore, a wire can be automatically fed with higher reliability. Accordingly, the maintenance cost can be reduced.

BEST MODE FOR CARRYING OUT THE INVENTION

First Embodiment

Figure 1:
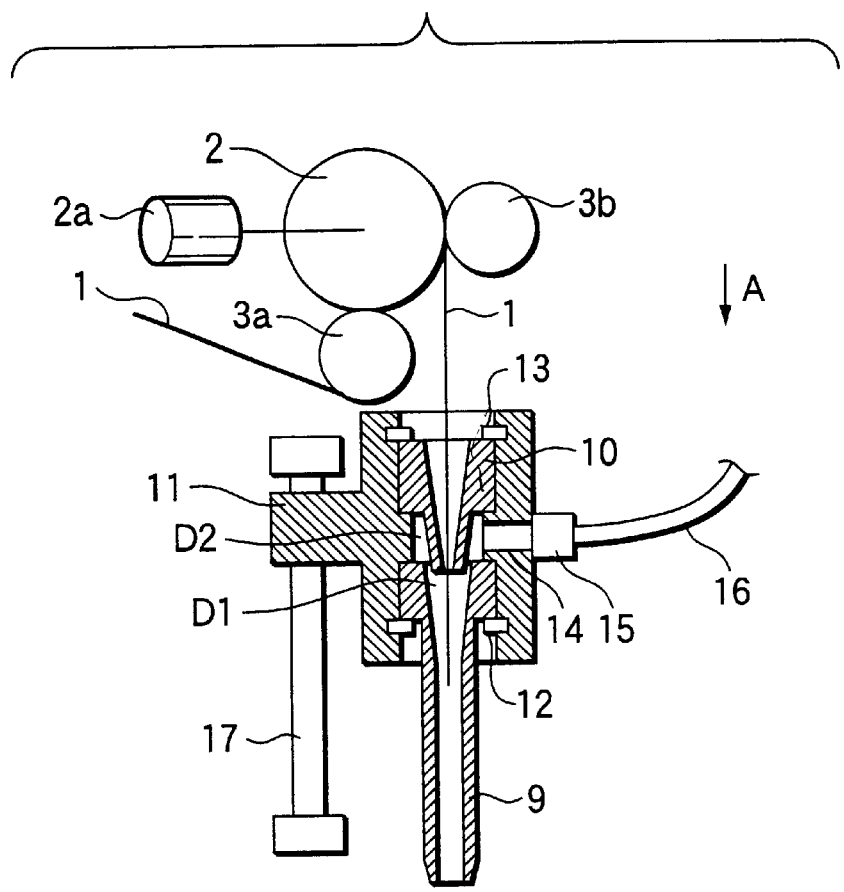
FIG. 1 is an arrangement view showing an automatic wire feeder of a wire electric discharge machine of a first embodiment of the present invention.
Figure 1:
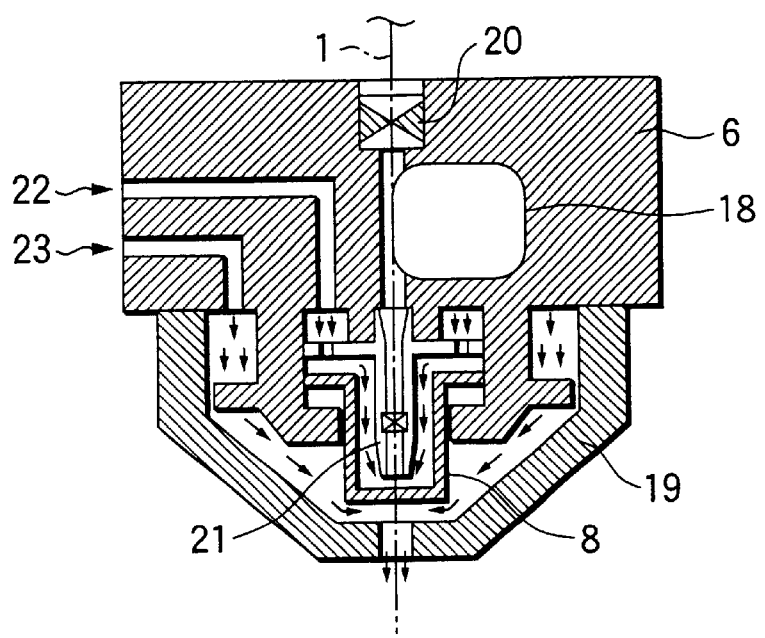

FIG. 1 is an arrangement view showing an automatic wire feeder of a wire electric discharge machine of a first embodiment of the present invention. In the drawing, reference character A represents a wire feed direction. In the drawing, reference numeral 1 is a wire electrode, reference numeral 2 is a feed roller, reference numeral 2a is a drive motor to drive the feed roller 2, reference numerals 3a and 3b are respectively a first and a second pinch roller to press the wire electrode 1 against the feed roller 2, reference numeral 6 is an upper wire guide, reference numeral 8 is a jet nozzle, reference numeral 9 is a guide pipe, reference numeral 10 is a hollow member, the outer diameter of which is reduced in a wire feed direction, reference numeral 11 is a slider block, reference numerals 12 and 13 are snap rings, reference numeral 14 is an outflow port, reference numeral 15 is a base, reference numeral 16 is a tube, reference numeral 17 is a drive unit, reference numeral 18 is an electric feeder piece, reference numeral 19 is a working solution nozzle, reference numeral 20 is an auxiliary guide, reference numeral 21 is a diamond die, reference numeral 22 is a jet stream of water, and reference numeral 23 is a working solution.

The hollow member 10 is arranged at an upper portion of the guide pipe 9. A forward end of the hollow member 10 is inserted into a tapered hole of the upper portion of the guide pipe 9 by a predetermined overlapping length, and clearance D1 is formed between the forward end of the hollow member 10 and the tapered hole of the guide pipe 9. Clearance D2 is formed between the hollow member 10 and the slider block 11. The guide pipe 9 and the hollow member 10 are respectively fixed to the slider block 11 by the snap rings 12 and 13. On the side of the slider block 11, there is provided an outflow port 14 extending to clearance D2, and this outflow port 14 is connected with the tube 16 by the base 15. Pressurized fluid can be supplied from the tube 16 into the outflow port 14. The slider block 11 can be elevated by the drive unit 17.

Figure 2:
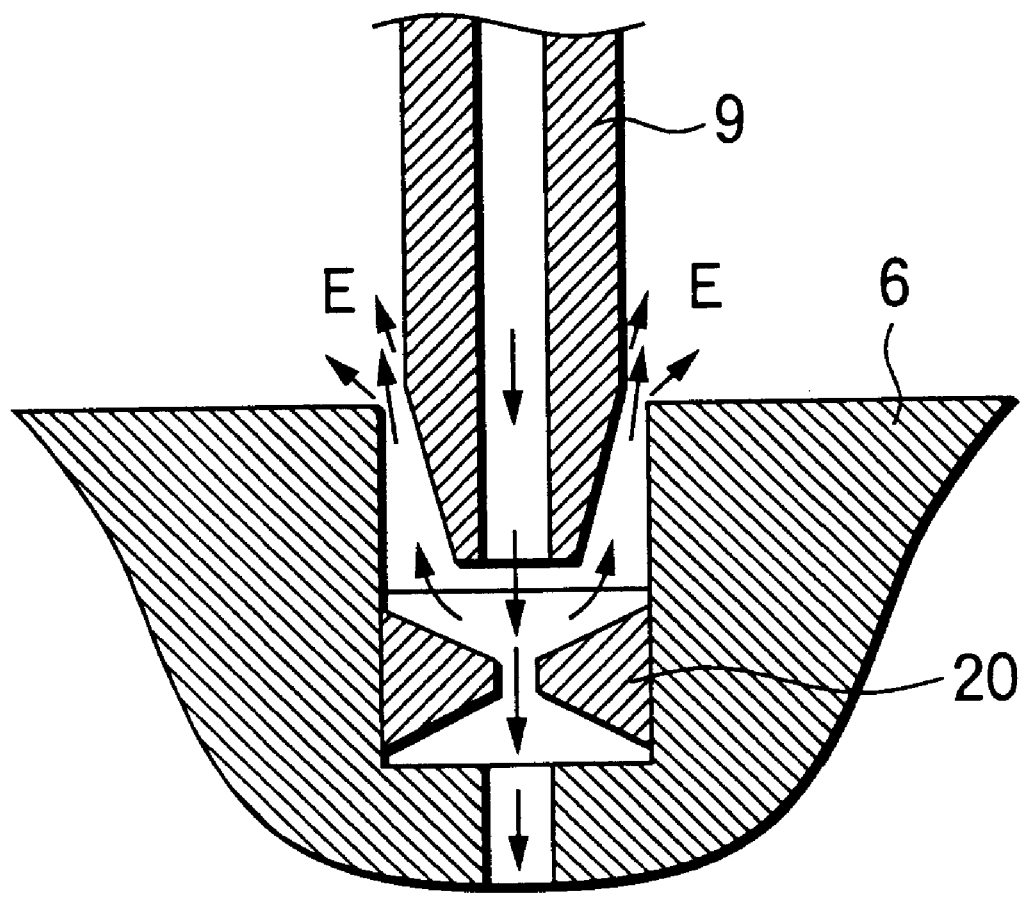
FIG. 2 is a schematic illustration for explaining circumstances in which fluid flows out in the neighborhood of a guide pipe and an auxiliary guide of an upper wire guide in case of using water as fluid.

A profile of the diamond die 21 is circular. Since the machining accuracy is important, the split guide structure, the accuracy of which is unstable, is not adopted, but the one body structure is adopted for the diamond die 21. The electric feeder piece 18, which supplies electric power to the wire electrode 1, and the auxiliary guide 20 are also important functional parts. Therefore, they are formed into a fixed structure. Accordingly, the guide pipe 9 can approach only an upper portion of the upper wire guide 6 in a direction of the workpiece. In this case, as shown in FIG. 2, in a portion in which the guide pipe 9 and the auxiliary guide 20 of the upper wire guide 6 come close to each other, an inner diameter of the auxiliary guide 20 is very small, that is, a passage of the fluid sent from the guide pipe 9 is throttled. Therefore, when liquid such as water is used as fluid, liquid such as water flows out from the clearance, and the wire electrode 1 tends to be forced out being carried by this current (E in the drawing) of liquid.

Accordingly, in the present invention, pressurized gas is supplied from a pressurized gas supply means (not shown), which is composed of a pump and others, for supplying pressurized gas such as air or nitrogen gas to the outflow port 14 via the tube 16 and the base 15 shown in FIG. 1. Viscosity of gas such as air or nitrogen is lower than that of liquid such as water. Therefore, it is possible to reduce an influence which is given to the wire electrode 1 by the current flowing out from the clearance. Therefore, the wire electrode can be automatically fed with high reliability.

Next, operation will be explained below. In FIG. 1, first of all, when the feed roller 2 is driven by the motor 2a, the wire electrode 1 is inserted to a position inside the guide pipe 9 from a wire bobbin not shown via the first pinch roller 3a, the feed roller 2 and the second pinch roller 3b. Next, pressurized gas is supplied from the pressurized gas supply means to clearance D2 via the tube 16, the base 15 and the outflow port 14. Pressurized gas flows in the guide pipe 9 via clearance D2 and clearance D1 and comes out from the lower side of the guide pipe 9. At this time, negative pressure is caused by the flow velocity of pressurized gas in the guide pipe 9. In this case, the flow velocity at the center of the guide pipe 9 is maximum. Therefore, a force to draw the wire electrode 1 to the center of the guide pipe 9 is generated. Therefore, it is possible to solve a problem of buckling of the wire electrode which is caused by the contact of the guide pipe 9 with the wire electrode 1.

Further, in the guide pipe 9, pressurized gas rubs the surface of the wire electrode 1, so that a frictional force is generated on the surface of the wire electrode 1. In addition to that, the wire electrode 1 is given a thrust in the wire feeding direction A. In the case of connection of the wire electrode, the slider block 11 is lowered by the drive unit 17, and the guide pipe 9 reaches the upper wire guide 6. By the above thrust and also by the thrust given by torque of the wire feed roller 2 driven by the drive motor 2a, the wire electrode 1 passes through the diamond die 21 of the upper wire guide 6 and arrives at the lower wire guide by a jet stream caused by the working solution nozzle 19.

As described above, the wire electrode can be automatically fed with high reliability.

When the wire connection is completed, the slider block 11 is elevated by the drive unit 17. Therefore, it is possible to ensure a space necessary for cutting the wire electrode 1 in a lower portion of the guide pipe 9.

Figure 3A:
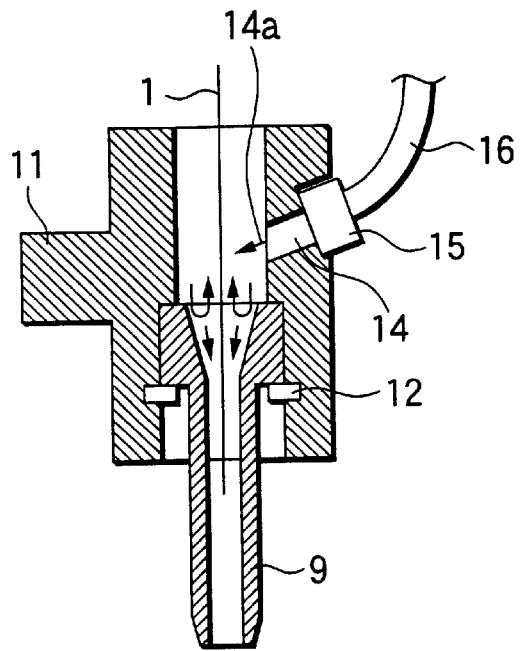
FIGS. 3A and 3B are schematic illustrations for explaining an arrangement not having a hollow member, the outer diameter of which is reduced in the wire feed direction, giving thrust to a wire electrode by pressurized gas such as air or nitrogen.
Figure 3B:
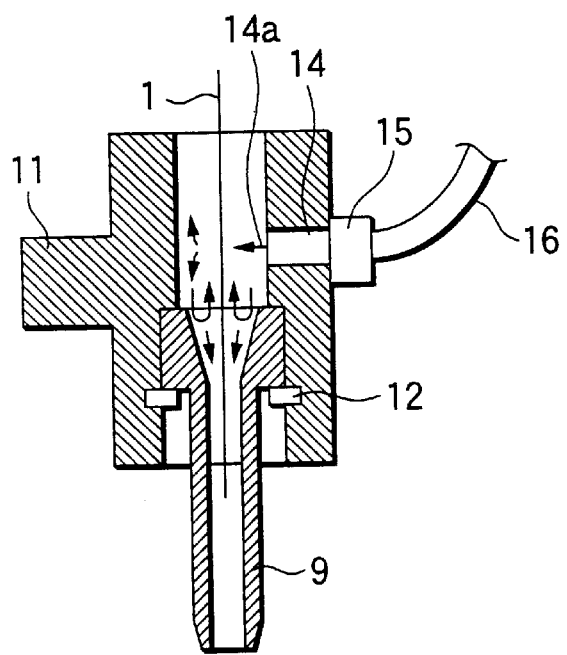

FIGS. 3A and 3B are schematic illustrations for explaining an arrangement not having a hollow member 10, the outer diameter of which is reduced in the wire feed direction, giving thrust to a wire electrode 1 by pressurized gas such as air or nitrogen. Like reference characters are used to indicate like parts in FIGS. 1 and 3. In FIG. 3, reference numeral 14a is a pressurized gas such as air or nitrogen. As shown in FIG. 3(a), in the case where pressurized gas 14a is obliquely sent from an upper portion of the guide pipe 9 and also in the case where pressurized gas 14a is sent downward from an upper portion of the guide pipe 9, it is impossible to obtain an effective thrust because a portion of pressurized gas 14a flows backward by an influence of the tapered portion in the upper portion of the guide pipe 9. As shown in FIG. 3(a), in the case where pressurized gas 14a is obliquely sent from the upper portion of the guide pipe 9, a force in the lateral direction is given to the wire electrode 1. Therefore, especially in the case of a fine wire, the wire is buckled, which could be a cause of a problem in which the wire is forced out. Further, as shown in FIG. 3(b), in the case where pressurized gas 14a is sent from the upper portion of the guide pipe 9 in the lateral direction, an intensity of the force given to the wire electrode 1 in the lateral direction is especially increased, and it is impossible to give an effective thrust to the wire electrode 1.

Figure 4:
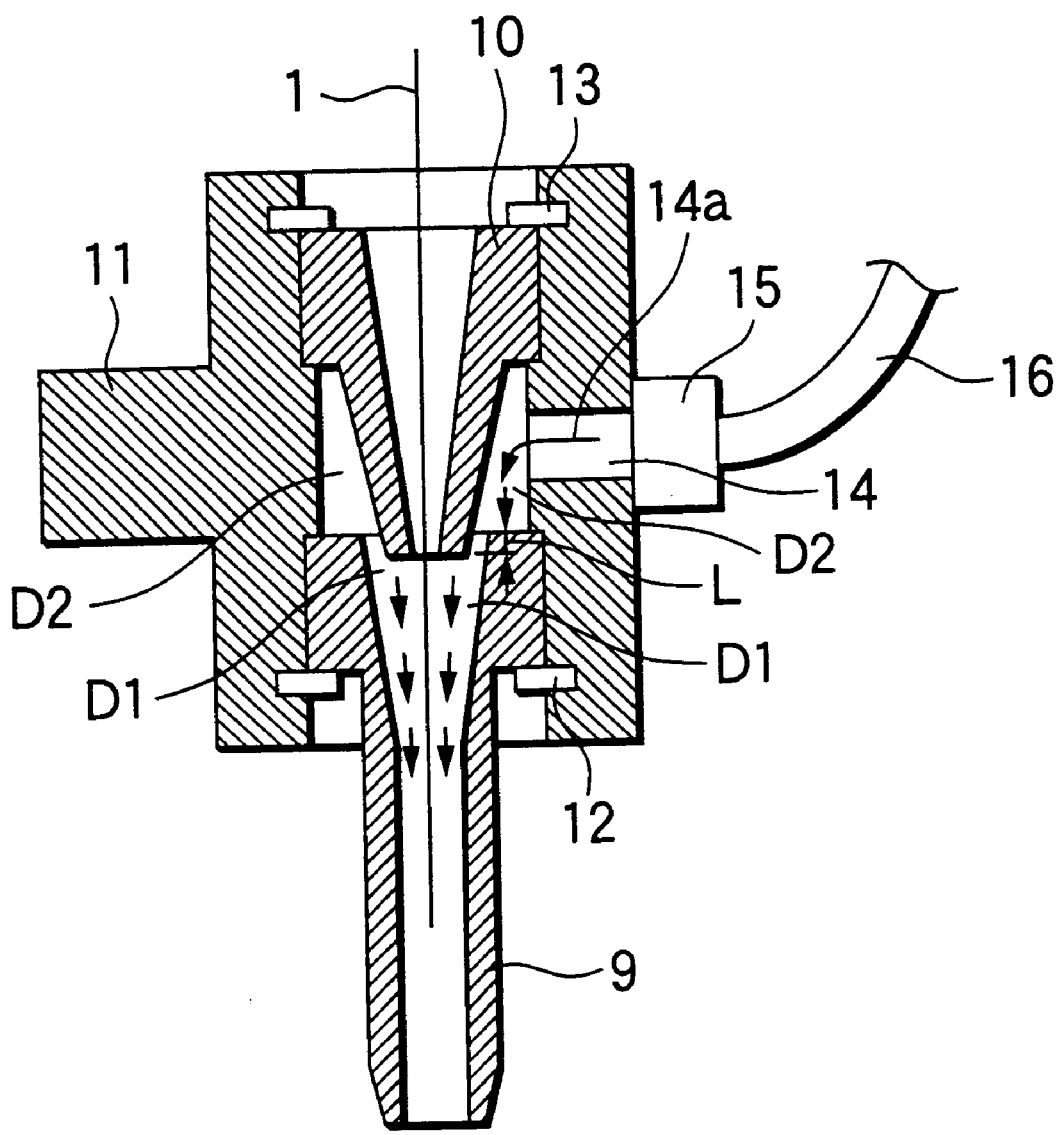
FIG. 4 is a schematic illustration for explaining a function of a hollow member, the outer diameter of which is reduced in the wire feed direction, of the first embodiment of the present invention.

Next, explanations will be made into a case in which thrust is given to the wire electrode by pressurized gas while the hollow member 10, the outer diameter of which is reduced in the wire feed direction, is used as shown in FIG. 1. FIG. 4 is a schematic illustration for explaining a function of the hollow member 10, the outer diameter of which is reduced in the wire feed direction, of the first embodiment of the present invention. Like reference characters are used to indicate like parts in FIGS. 1 and 4. In FIG. 4, reference numeral 14a is a pressurized gas such as air or nitrogen. Since the hollow member 10 is arranged, pressurized gas 14a does not create a force to be given to the wire electrode 1 in the lateral direction. Therefore, pressurized gas 14a is introduced into the guide pipe 9 along the outer diameter of the hollow member 10 and flows in the guide pipe in the wire feeding direction. As described above, while pressurized gas 14a does not flow backward, pressurized gas 14a is effectively sent out in the wire feeding direction so that the wire electrode 1 can be given thrust. Accordingly, the entire pressurized gas gives the wire electrode a frictional force, that is, it is possible for the entire pressurized gas to give an effective thrust.

Further, negative pressure is generated by the flow velocity in the lower portion of the hollow member 10, and thrust is also generated by the pressure of air flowing from the hollow member 10 into the guide pipe 9. In this case, when an inner diameter portion of the hollow member 10, the outer diameter of which is reduced in the wire feeding direction, is formed into a nozzle profile as shown in FIGS. 1 and 4, an intensity of the thrust given to the wire electrode 1 is further increased.

In the above structure, the overlapping length (L in FIG. 4), by which the hollow member 10 and the guide pipe 9 are overlapped with each other, has a great effect on the thrust. For example, in the case where the inner diameter of the guide pipe 9 is 1.5 mm, the taper angle of the upper portion of the guide pipe 9 is 0.524 rad, the outer diameter at the lowermost end of the hollow member is 2.5 mm, the inner diameter at the lowermost end of the hollow member is 0.35 mm and the taper angle of the outer diameter of the hollow member is 0.428 rad, the thrust works effectively when the overlapping length L is set at 3.5 mm (Clearance D1 is approximately 0.7 mm.), and an intensity of the thrust is reduced when the overlapping length L is longer than that. That is, in the dimensions such as an overlapping length L and others, predetermined values exist for effectively generating the thrust in the wire electrode. These values can be determined by experiments according to a predetermined performance.

Second Embodiment

Figure 5:
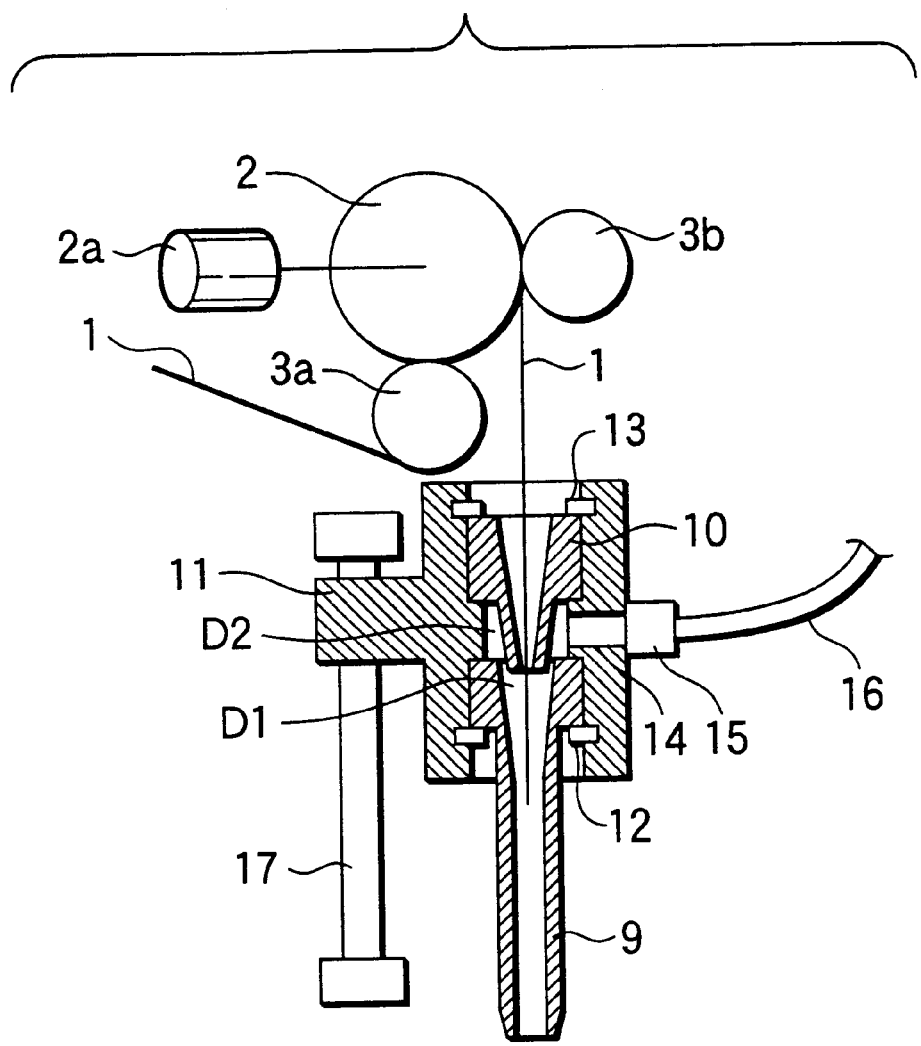
FIG. 5 is an arrangement view showing an automatic wire feeder of a wire electric discharge machine of a second embodiment of the present invention.
Figure 5:
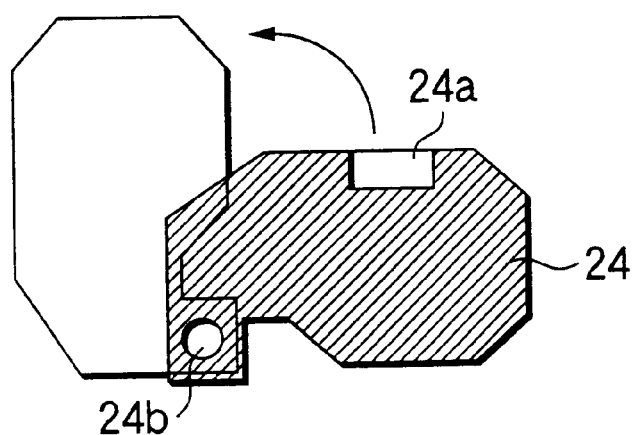

FIG. 5 is an arrangement view showing an automatic wire feeder of a wire electric discharge machine of a second embodiment of the present invention. Like reference characters are used to indicate like parts in FIGS. 1 and 5. In FIG. 5, reference numeral 24 is a pressurized gas stopping means for stopping a flow of pressurized gas in the guide pipe 9 at the forward end of the guide pipe 9, reference numeral 24a is a socket, and reference numeral 24b is a fulcrum. The pressurized gas stopping means 24 can be rotated around the fulcrum 24b.

In the normal operation of the wire electrode 1, that is, when the wire electrode 1 is automatically fed and electric discharge machining is normally conducted, the pressurized gas stopping means 24 is retracted outside the wire traveling passage only when it is necessary to wash the inside the guide pipe, the pressurized gas stopping means 24 is put into the wire traveling passage, and the socket 24a receives the guide pipe 9 which is coming downward. Under the condition that the guide pipe 9 is received by the socket 24a, pressurized gas is supplied from the pressurized gas supply means not shown to the outflow port 14 via the tube 16 and the base 15. Pressurized gas, which has passed through the guide pipe and arrived at the socket 24a, flows backward in the guide pipe 9 because a forward end of the guide pipe 9 is closed by the socket 24a of the pressurized gas stopping means 24. Therefore, it is possible to remove contamination and adhering matters from the inside of the guide pipe 9. In this way, the inside of the guide pipe can be effectively washed. In order to return to the normal operation, the pressurized gas stopping means 24 is rotated around the fulcrum 24b so that the pressurized gas stopping means 24 can be retracted outside the wire traveling passage.

Third Embodiment

Figure 6A:
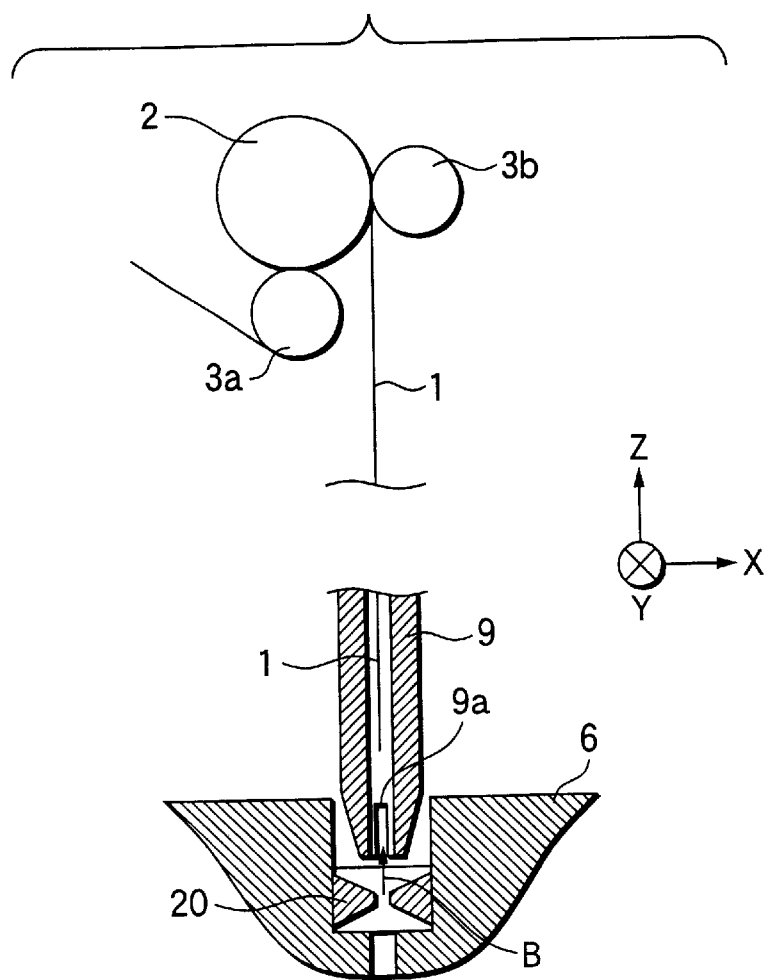
FIGS. 6A–6C are arrangement views showing an automatic wire feeder of a wire electric discharge machine of a third embodiment of the present invention.
Figure 6B:
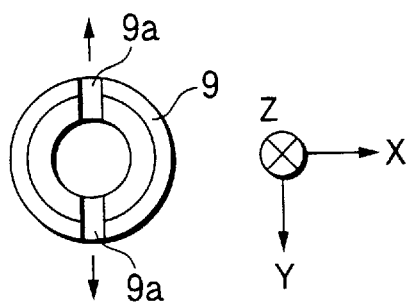
Figure 6C:
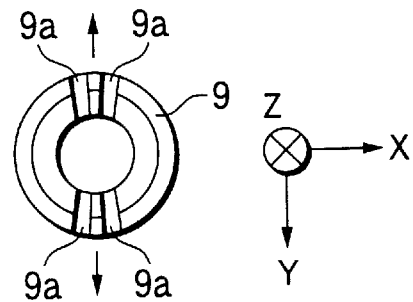
Figure 7:
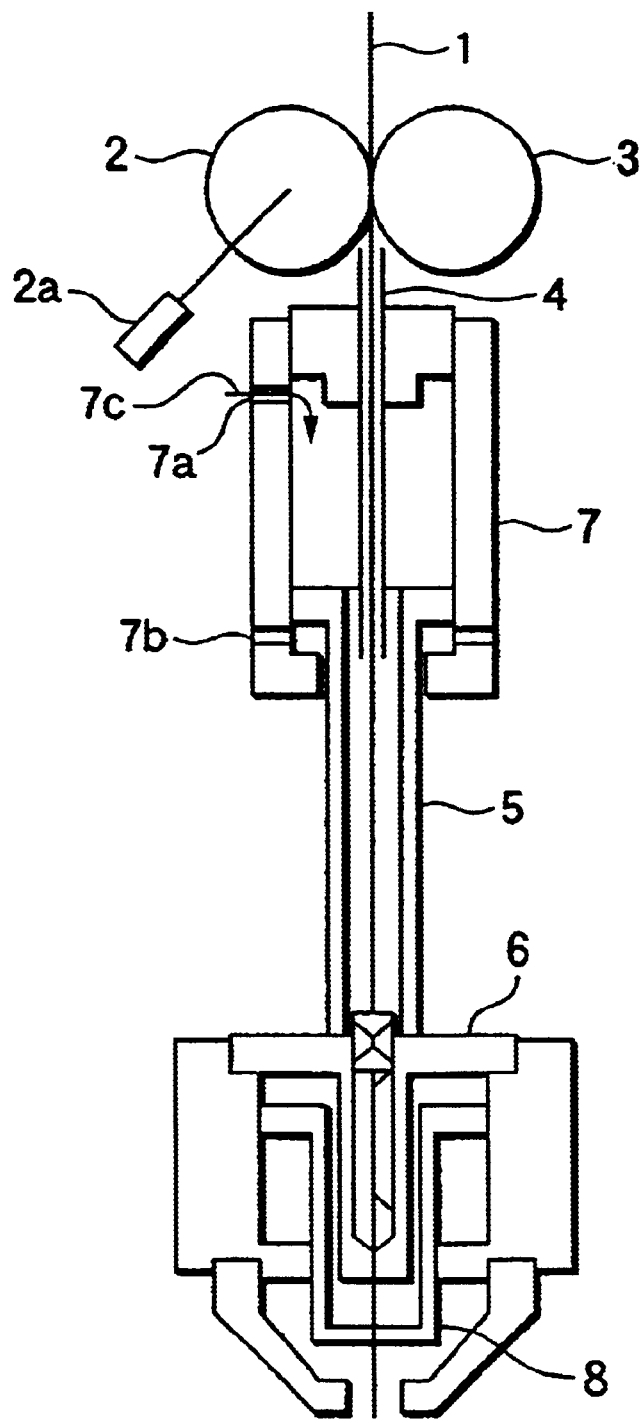
FIG. 7 is an arrangement view showing an automatic wire feeder of a conventional wire electric discharge machine.
Figure 8:
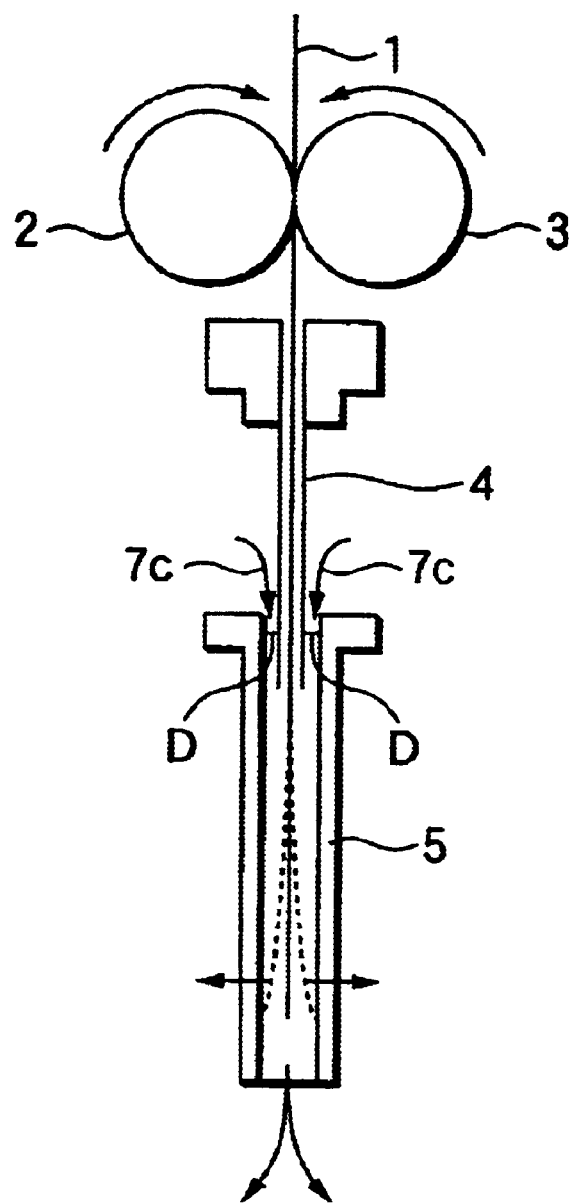
FIG. 8 is a schematic illustration for explaining operation of an automatic wire feeder of a conventional wire electric discharge machine.

FIGS. 6A–6C are arrangement views showing an automatic wire feeder of a wire electric discharge machine of a third embodiment of the present invention. In the drawing, reference numeral 1 is a wire electrode, reference numeral 6 is an upper wire guide, reference numeral 9 is a guide pipe, reference numeral 9a is a slit formed at a forward end of the guide pipe 9, and reference numeral 20 is an auxiliary guide. FIG. 6(b) is a view of the guide pipe 9 which is obtained when the guide pipe 9 is viewed from position B in FIG. 6(a) in the direction of an arrow.

The guide pipe 9 functions as a guide for guiding the wire electrode 1 to the upper wire guide 6. Therefore, when the guide pipe 9 is lowered, a forward end of the guide pipe 9 enters an upper portion of the upper wire guide 6. In the third embodiment, pressurized gas, which has passed in the guide pipe 9, can be let off from the slit 9a. Accordingly, there is no possibility that pressurized gas flows backward in the guide pipe 9. Therefore, a sufficiently large quantity of pressurized gas can flow in the guide pipe 9. As a result, it is possible to give a higher intensity of thrust to the wire electrode 1.

When the wire electrode 1 is sent out by the feed roller 2, the wire electrode 1 tends to be curled in the tangent direction of the feed roller 2. That is, the wire electrode 1 tends to be curled on the XZ plane in FIG. 6(a). When the slit 9a is formed as shown in FIG. 6(b), there is no possibility that the wire electrode 1, which is curled on the XZ plane, is forced out from this slit 9a because pressurized gas flows out from this slit 9a in the Y direction. Therefore, the wire electrode can be automatically fed with higher reliability. The slit 9a is not limited to the above specific embodiment shown in FIG. 6(b) in which two slits are formed in the Y direction. For example, it is possible to provide slits which are formed in a direction a little different from the Y direction as shown in FIG. 6(c).

INDUSTRIAL APPLICAPABILITY

As described above, the automatic wire feeder of the wire electric discharge machine of the present invention is appropriately used for wire electric discharge work.

What is claimed is:

1. An automatic wire feeder of a wire electric discharge machine in which electric discharge is generated between a traveling wire electrode and a workpiece to machine the workpiece by electric discharge energy, comprising:
    a feed roller for feeding the wire electrode;
    a slider block supported movable up and down;
    a guide pipe fixed to the slider block, the guide pipe for guiding the wire electrode;
    a hollow member fixed to the slider block, an outer diameter of the hollow member reduced in a wire feed direction; and
    a pressurized gas supply means for supplying pressurized gas toward the outer diameter of the hollow member,
    wherein a forward end section of the hollow member is inserted into an inner diameter section of an upper section of the guide pipe while a predetermined overlapping length is kept, the predetermined overlapping length at which a thrust of the wire electrode has a local maximum value or a value of substantially the local maximum value;
    a predetermined clearance is formed between the inner diameter of the guide pipe and the outer diameter of the forward end section of the hollow member; and
    a thrust is given to the wire electrode when pressurized gas supplied by the pressurized gas supply means flows in the guide pipe via the clearance.

2. The automatic wire feeder according to claim 1, wherein the inner diameter of the upper section of the guide pipe is reduced in the wire feed direction.

3. The automatic wire feeder according to claim 1, wherein the inner diameter portion of the hollow member is formed into a nozzle profile.

4. The automatic wire feeder according to claim 1, wherein a slit is formed at a forward end of the guide pipe.

5. The automatic wire feeder according to claim 4, wherein the slit is formed in a direction substantially perpendicular to a plane on which a curl of the wire electrode is formed.

6. An automatic wire feeder of a wire electric discharge machine in which electric discharge is generated between a traveling wire electrode and a workpiece to machine the workpiece by electric discharge energy, comprising:
    a feed roller for feeding the wire electrode;
    a slider block supported movable up and down;
    a guide pipe fixed to the slider block, the guide pipe for guiding the wire electrode;
    a hollow member fixed to the slider block, an outer diameter of the hollow member reduced in a wire feed direction;
    a pressurized gas supply means for supplying pressurized gas toward the outer diameter of the hollow member; and
    a pressurized gas stopping means for stopping a current of pressurized gas flowing in the guide pipe at a forward end of the guide pipe, the pressurized gas stopping means retractable from the wire traveling passage,
    wherein a thrust is given to the wire electrode when pressurized gas supplied by the pressurized gas supply means flows in the guide pipe via the clearance.

7. An automatic wire feeder of a wire electric discharge machine in which electric discharge is generated between a traveling wire electrode and a workpiece to machine the workpiece by electric discharge energy, comprising:
    a feed roller for feeding the wire electrode;
    a slider block supported movable up and down;
    a guide pipe fixed to the slider block, the guide pipe for guiding the wire electrode, the guide pipe having a hollow;
    a hollow member fixed to the slider block, an outer diameter of the hollow member reduced in a wire feed direction, the hollow member inserted into the hollow of the guide pipe to define a predetermined clearance between the guide pipe and the hollow member; and
    a pressurized gas supply for supplying pressurized gas into the hollow of the guide pipe via the clearance to provide the wire electrode with a thrust.

8. The automatic wire feeder according to claim 7, wherein the inner diameter of the guide pipe is reduced in the wire feed direction.

9. The automatic wire feeder according to claim 7, wherein the inner diameter portion of the hollow member is formed into a nozzle profile.

10. The automatic wire feeder according to claim 7, further comprising a pressurized gas stopper disposed on the wire traveling path to stop a current of the pressurized gas jetting out from the guide pipe, the pressurized gas stopper retractable from the wire traveling passage.

11. The automatic wire feeder according to claim 10, wherein the pressurized gas stopper disposed on the wire traveling path when the inside of the guide pipe is washed.

12. The automatic wire feeder according to claim 7, wherein a slit is formed at a forward end of the guide pipe.

13. The automatic wire feeder according to claim 12, wherein the slit is formed in a direction substantially perpendicular to a plane on which a curl of the wire electrode is formed.

* * * * *